(12) United States Patent
Chen et al.

(10) Patent No.: US 9,617,356 B2
(45) Date of Patent: Apr. 11, 2017

(54) CROSSLINKED POLYETHYLENE COMPOSITION

(75) Inventors: Xuelian Chen, Beijing (CN); Wenbin Liang, Beijing (CN); Yanhua Niu, Beijing (CN); Shih-yaw Lai, Beijing (CN)

(73) Assignees: National Institute of Clean-and-Low-Carbon Energy, Beijing (CN); Shenhua Group Corporation Limited, Beijing (CN)

( * ) Notice: Subject to any disclaimer, the term of this patent is extended or adjusted under 35 U.S.C. 154(b) by 0 days.

(21) Appl. No.: 14/407,352

(22) PCT Filed: Jun. 13, 2012

(86) PCT No.: PCT/CN2012/076818
§ 371 (c)(1),
(2), (4) Date: May 4, 2015

(87) PCT Pub. No.: WO2013/185302
PCT Pub. Date: Dec. 19, 2013

(65) Prior Publication Data
US 2015/0232586 A1    Aug. 20, 2015

(51) Int. Cl.
*C08F 10/02*    (2006.01)
(52) U.S. Cl.
CPC .................... *C08F 10/02* (2013.01)
(58) Field of Classification Search
CPC ........ C08K 5/36; C08K 5/14; C08K 5/34924; C08F 10/02
See application file for complete search history.

(56) References Cited

U.S. PATENT DOCUMENTS

| 3,079,379 A | 2/1963 | Tanaka et al. |
| 3,214,422 A | 10/1965 | Mageli et al. |

(Continued)

FOREIGN PATENT DOCUMENTS

| CN | 1580113 A | 2/2005 |
| CN | 1974650 A | 6/2007 |

(Continued)

OTHER PUBLICATIONS

Crawford, R.J., et al., "Rotational Molding Technology," 2001, Plastics Design Library, William Andrew Publishing, Norwich, New York, pp. 2-13.

(Continued)

*Primary Examiner* — Mark Kaucher
(74) *Attorney, Agent, or Firm* — Senniger Powers LLP

(57) ABSTRACT

A crosslinked polyethylene composition comprising 100 parts by weight of polyethylene, 0.05-5 parts by weight of crosslinking agent, 0.03-3 parts by weight of crosslinking aid. Polyethylene is a copolymer, homopolymer and/or a mixture thereof. The crosslinking agent is an organic peroxide having a half-life period longer than 3 minutes at 190° C. and/or a multi-membered heterocyclic alkane consisting of 3 to 6 carbon atoms and 3 to 6 oxygen atoms and/or a derivative thereof. The crosslinking aid is an organic substance containing allyl, maleimido, (meth)acrylate group and/or a polymer having a vinyl content higher than 50%. Preferably, the crosslinking aid is triallyl isocyanate (TAIC), triallyl cyanurate (TAC) or a mixture thereof. The crosslinked polyethylene composition has a crosslinking efficiency index >1000 Nm/g and a δ torque value >15 Nm at 220° C., and has a high safe processing temperature and long crosslinking delay, and therefore is particularly suitable for rotationally molded products.

7 Claims, 2 Drawing Sheets

(56) References Cited

U.S. PATENT DOCUMENTS

| | | | |
|---|---|---|---|
| 3,876,613 A | 4/1975 | Needham et al. | |
| 3,974,114 A | 8/1976 | Sowa | |
| 4,029,729 A | 6/1977 | Rees et al. | |
| 4,115,508 A | 9/1978 | Hughes | |
| 4,267,080 A * | 5/1981 | Yokoyama | C08F 255/02 264/310 |
| 4,731,393 A * | 3/1988 | Karrer | C08F 255/00 522/114 |
| 5,245,084 A | 9/1993 | Groepper et al. | |
| 5,260,381 A * | 11/1993 | Needham | C08L 23/04 524/524 |
| 5,292,791 A | 3/1994 | Groepper et al. | |
| 5,367,025 A | 11/1994 | Needham | |
| 5,849,214 A | 12/1998 | Novits et al. | |
| 5,856,412 A * | 1/1999 | Bock | C08F 8/00 525/313 |
| 6,180,706 B1 | 1/2001 | Keogh | |
| 6,555,019 B2 | 4/2003 | Palys et al. | |
| 6,864,323 B2 | 3/2005 | Schlosser et al. | |
| 7,056,967 B2 | 6/2006 | Voigt et al. | |
| 7,825,059 B2 | 11/2010 | Meijer et al. | |
| 7,842,759 B2 | 11/2010 | Esseghir et al. | |
| 7,943,694 B2 | 5/2011 | Varnhorn et al. | |
| 2001/0002075 A1* | 5/2001 | Chaudhary | C08J 3/226 264/51 |
| 2002/0177671 A1 | 11/2002 | Palys et al. | |
| 2004/0127610 A1* | 7/2004 | Russell | C08K 5/526 524/115 |
| 2009/0020749 A1* | 1/2009 | Jager | C08F 210/02 257/40 |
| 2010/0286308 A1* | 11/2010 | Carlsson | C08K 5/13 523/216 |
| 2011/0245417 A1 | 10/2011 | Mori et al. | |
| 2015/0232586 A1 | 8/2015 | Chen et al. | |
| 2015/0291774 A1* | 10/2015 | Chen | C08K 5/14 524/333 |

FOREIGN PATENT DOCUMENTS

| | | |
|---|---|---|
| CN | 101107297 A | 1/2008 |
| CN | 101134826 A | 3/2008 |
| CN | 101284911 A | 10/2008 |
| CN | 101481475 A | 7/2009 |
| CN | 101525471 A | 9/2009 |
| CN | 102140193 A | 8/2011 |
| CN | 102186900 A | 9/2011 |
| CN | 102492213 A | 6/2012 |
| DE | 2553094 A1 | 8/1976 |
| DE | 2553145 A1 | 8/1976 |
| EP | 0087210 A1 | 8/1983 |
| GB | 1294154 A | 10/1972 |
| GB | 1535039 A | 12/1978 |
| GB | 1535040 A | 12/1978 |
| JP | S55111116 A | 8/1980 |
| JP | S61238840 A | 10/1986 |
| JP | 624667 B2 | 1/1987 |
| WO | 2006066984 A1 | 6/2006 |

OTHER PUBLICATIONS

English Abstract CN1580113A, 1 page, 2009.
English Abstract JPS55111116A, 2 pages, 1980.
English Abstract JPS61238840A, 1 page, 1986.
International Search Report issued in PCT/CN2012/076818, dated Mar. 21, 2013, 8 pages.
Written Opinion issued in PCT/CN2012/076818, dated Mar. 21, 2013, 15 pages.

* cited by examiner

CROSSLINKED POLYETHYLENE COMPOSITION

REFERENCE TO CORRESPONDING APPLICATIONS

This application is the 371 National Stage Application based on International Application No. PCT/CN2012/076818, filed Jun. 13, 2012.

FIELD OF THE INVENTION

This invention relates to a crosslinked polyethylene composition and a crosslinking aid of the polyethylene composition, in particular, a crosslinked polyethylene composition having an improved or raised crosslinking temperature, safety processing temperature, crosslinking degree after formation, and/or crosslinking retardation time. This invention also relates to a polyethylene composition especially suitable for the production of rotational molding articles.

BACKGROUND ART

So far, due to the excellent physical and chemical properties, good processability, and outstanding cost performance, polyethylene is widely applied to various fields as one of the most important materials. It can be processed into articles in various shapes by using various molding methods, such as extrusion molding, blow molding, injection molding, film molding, rotational molding and the like. Typical examples of articles of this kind include tube, drum, bottle, box, film, piece, etc. However, polyethylene materials having different physical properties and processabilities are required for various articles, so as to obtain qualified ones. Some special articles, for example, tube, bottle and film, require the polyethylene to have not only excellent physical property and processability, but also a good balance between the two properties. Thus, stringent requirements on the polyethylene material greatly increase difficulty in microstructure design of the polyethylene material, especially in material composition and molecular structure design.

The molding of polyethylene articles started from the 1950s, which has prominent advantages for molding large and hollow articles, for example, the articles have no wield marks, no residual stresses, and the moulds have a low cost. Usually, the rotational molding method comprises the following steps: (1) feeding: feeding the plastic resin powders into a hollow mould; (2) heating: heating the hollow mould to melt the resin powders therein, while rotating the hollow mould so as to take advantage of the centrifugal force to make the melted resin powders stick closely to the inwall of the rotating hollow mould; accordingly, the molding and self-compaction are achieved; (3) cooling: cooling the hollow mould and the shaped resin article by means of such cooling mediums as air and/or water; (5) demolding: taking out the cooled article. For the details of the abovementioned rotational molding, please refer to "ROTATIONAL MOLDING TECHNOLOGY," 2001, pp. 2-13, as well as U.S. Pat. No. 4,029,729 and U.S. Pat. No. 4,115,508.

Obviously, in all the polyethylene articles, the molding of a large and hollow article is the most difficult, particularly for the rotational molding, because the rotational molding requires a very good balance between the physical properties and the processing properties of a polyethylene composition. However, a lot of known polyethylene raw materials, in particular conventional non-crosslinked polyethylene compositions, cannot completely meet the abovementioned strict requirement. A rotationally-molded crosslinked resin article has a series of important advantages, such as a relatively high heat distortion temperature (HDT), a relatively high tensile strength, a relatively low thermal expansion coefficient, a relatively strong environmental stress cracking resistance (ESCR), excellent weather resistance and outstanding chemical solvent resistance, etc.

Crosslinking agents commonly applied to rotational molding polyethylene compositions are various peroxides. An ideal crosslinking agent shall enable a polyethylene composition to have a suitable crosslinking retardation time (scorch time) so as to avoid impact on processing and formation by premature crosslinking of the composition, and, meanwhile, it shall broaden the safety processing window of the composition. However, the vast majority of the abovementioned peroxide crosslinking agents do not possess such characteristics, so the effect thereof is unsatisfactory.

To solve that technical problem, one solution is to add an aid to a crosslinked resin composition using a peroxide as crosslinking agent to improve the crosslinking retardation time. DE2553145 and DE2553094 disclose the content of using a mixture of peroxides of different crosslinking retardation times. However, a disadvantage of doing that is the time of curing (maintaining) the crosslinked resin composition becomes longer, which is very disadvantageous for shortening the production time. Furthermore, due to the carcinogenic risk of amine-based aids, they are now not allowed to be used any more.

It is known that quinhydrone and antioxidants can be used as crosslinking retarders for crosslinked resin compositions which employ peroxides as crosslinking agents. However, the addition of quinhydrone and antioxidants leads to a decrease of δ(delta) torque value after crosslinking, and further impacts the final properties of the cured article. As to the technical details hereinabove, reference can be made to U.S. Pat. No. 5,292,791 and U.S. Pat. No. 5,245,084.

Another method to solve the abovementioned technical problem is to use an organic peroxide with a relatively long half-life period as the crosslinking agent. WO2006/066984 discloses that an organic peroxide of trioxepanes has a relatively half-life period, but the crosslinking efficiency is relatively low when said peroxide is used alone, which cannot meet the requirement of production and use. All the abovementioned reference documents are incorporated here in entirety for reference.

Therefore, the present invention aims to find a crosslinked composition system that can significantly improve or raise the safety processing temperature of a crosslinked polyethylene composition, so as to avoid premature crosslinking of the crosslinked polyethylene composition, and, meanwhile, so that the composition possesses a relatively long crosslinking retardation time, a relatively high crosslinking degree and crosslinking efficiency.

SUMMARY OF THE INVENTION

A main object of this invention is to provide a crosslinked polyethylene composition. During the rotational molding, injection molding and other suitable moldings of the composition, premature crosslinking before the densification thereof can be avoided, and, meanwhile, the curing (maintaining) speed thereof can be improved so as to attain the purpose of reducing processing time and increasing productivity.

Another object of this invention is to provide a crosslinking aid of the polyethylene composition, capable of improving the crosslinking temperature, safety processing temperature, crosslinking degree after formation, and/or appropriately extending the crosslinking retardation time.

According to the first aspect of this invention, provided is a crosslinked polyethylene composition comprising: 100 parts by weight of polyethylene, 0.05-5 parts by weight of crosslinking agent, 0.03-3 parts by weight of crosslinking aid, wherein the polyethylene is a copolymer, homopolymer and/or a mixture thereof; the crosslinking agent is an organic peroxide having a half-life period >3 minutes at 190° C.; the crosslinking aid is a polymer with a vinyl content of higher than 50%, and/or an organic substance containing maleimido, (meth)acrylate group, and/or allyl. Said crosslinked polyethylene composition has a crosslinking efficiency index of >1000 Nm/g at 220° C. and a δ torque value of >15 Nm, and, meanwhile, possesses a relatively high safety processing temperature and a relatively long crosslinking retardation time.

According to the second aspect of this invention, provided is a crosslinked polyethylene composition comprising: 100 parts by weight of polyethylene, 0.05-5 parts by weight of crosslinking agent, 0.03-3 parts by weight of crosslinking aid, wherein the polyethylene is a copolymer and/or homopolymer; the crosslinking agent is a multi-membered heterocyclic alkane and/or derivatives thereof comprising 3-6 carbon atoms and 3-6 oxygen atoms; the crosslinking aid is a polymer with a vinyl content of higher than 50%, and/or an organic substance containing maleimido, (meth)acrylate group, and/or allyl.

According to the first and second aspects of this invention, said crosslinking agent is preferably 3,6,9-triethyl-3,6,9-trimethyl-1,4,7-triperoxynonane, 3,3,5,7,7-pentamethyl-1,2,4-trioxepane, 3,3,5,7,7-pentamethyl-1,3,5-trioxepane, 2,2,4,6,6-pentamethyl-1,2,4-trioxepane, 2,2,4,6,6-pentamethyl-1,3,5-trioxepane, and/or a mixture thereof or derivatives thereof.

According to the first and second aspects of this invention, the crosslinking aid can be preferably a polymer with a vinyl content of higher than 50%, and the examples thereof can be 1,2-polybutadiene, triallyl isocyanate (TAIC), cis-1,2-polybutadiene (1,2-BR), diallyl terephthalate (DATP), divinylbenzene (DVB), triallyl cyanurate (TAC), and/or triallyl cyanurate (TAP), wherein the triallyl cyanurate (TAC), triallyl isocyanate (TAIC) and/or a mixture thereof are even more preferable.

The abovementioned crosslinking agents "do not" give rise to crosslinking of the polyethylene composition at a temperature below 180° C., and thus the safety processing temperature of said crosslinking polyethylene composition reaches above 150° C. When the abovementioned crosslinking agents and crosslinking aids are used in combination, the crosslinking efficiency index of said crosslinked polyethylene composition can reach above 1000 Nm/g at 220° C. Due to those characteristics, the crosslinked polyethylene composition of the present invention is particularly suitable for the production of rotational molding articles.

The so-called "do not" indicates that the maximum torque value of the polyethylene composition at said temperature is <the minimum torque value+2. The so-called "crosslinking efficiency index" is an index reflecting that, at a certain temperature, the polyethylene composition both has a relatively long crosslinking retardation time and a relatively high crosslinking speed, which is represented by the product of the crosslinking retardation time and the crosslinking speed produced by a unit active oxygen, the unit thereof being Nm/g.

According to the third aspect of this invention, provided is the crosslinking aid of a polyethylene composition, comprising based on the weight of polyethylene: 0.05-5 percent by weight of crosslinking agent, 0.03-3 percent by weight of crosslinking aid, wherein the polyethylene is a copolymer, homopolymer and/or a mixture thereof; the crosslinking agent is an organic peroxide having a half-life period >3 minutes at 190° C.; the crosslinking aid is a polymer with a vinyl content of higher than 50%, and/or an organic substance containing maleimido, (meth)acrylate group, and/or allyl. Due to said crosslinking aid, the polyethylene composition has a crosslinking efficiency index of >1000 Nm/g and a δ torque value of >15 Nm at 220° C., and, meanwhile, possesses a relatively high safety processing temperature and a relatively long crosslinking retardation time.

According to the fourth aspect of this invention, provided is the crosslinking aid of a polyethylene composition, comprising based on the weight of polyethylene: 0.05-5 percent by weight of crosslinking agent, 0.03-3 percent by weight of crosslinking aid, wherein the polyethylene is a copolymer, homopolymer and/or a mixture thereof; the crosslinking agent is a multi-membered heterocyclic alkane and/or derivatives thereof comprising 3-6 carbon atoms and 3-6 oxygen atoms; the crosslinking aid is a polymer with a vinyl content of higher than 50%, and/or an organic substance containing maleimido, (meth)acrylate group, and/or allyl.

According to the third and fourth aspects of this invention, said crosslinking agent is preferably 3,6,9-triethyl-3,6,9-trimethyl-1,4,7-triperoxynonane, 3,3,5,7,7-pentamethyl-1,2,4-trioxepane, 3,3,5,7,7-pentamethyl-1,3,5-trioxepane, 2,2,4,6,6-pentamethyl-1,2,4-trioxepane, 2,2,4,6,6-pentamethyl-1,3,5-trioxepane, and/or a mixture thereof or derivatives thereof.

The abovementioned crosslinking aid of a polyethylene composition is used for improving the crosslinking temperature, safety processing temperature, crosslinking degree after formation, and/or crosslinking retardation time of the polyethylene composition.

SPECIFIC EMBODIMENTS

Figure 1:
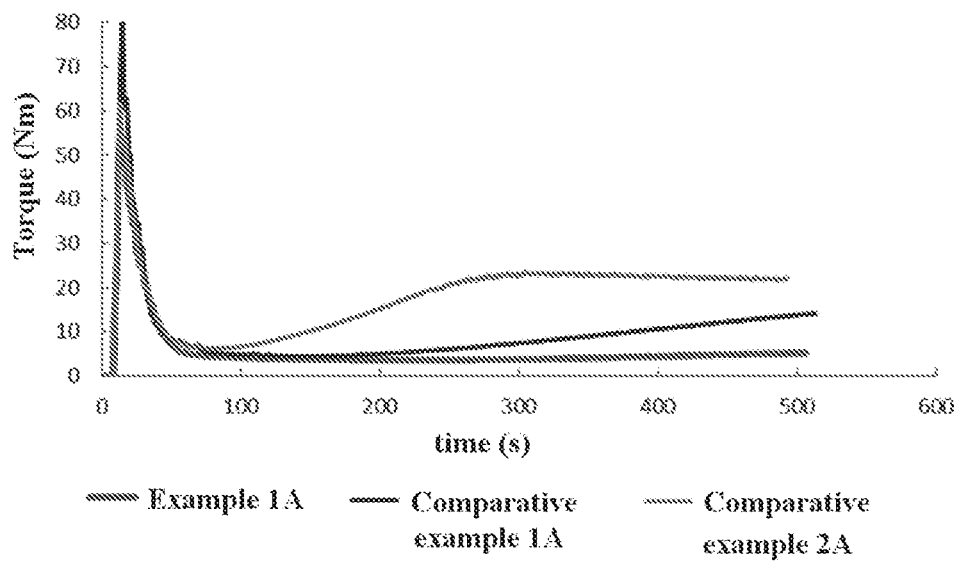
FIG. 1 is a rheogram of the torque values of the various polyethylene compositions in Example 1A, Comparative Example 1A, and Comparative Example 2A at the temperature of 180° C.

The present invention is further disclosed in detail by the following reference figures, so as to enable a person skilled in the art to clearly figure out the mechanism and essence of the present invention. However, the description below is exemplary only, without any form of limitation to the present invention.

It is known from the prior art that: under general conditions, the mechanical properties and thermal properties of polyethylene will be greatly improved during crosslinking. The technology of polyethylene crosslinking has long been acknowledged, and quite familiar to those skilled in the art, for example, U.S. Pat. No. 3,079,379 discloses a method for chemical crosslinking of polyethylene, and British Patent No. 1294154 also discloses several improved solution of the method for chemical crosslinking of polyethylene.

In fact, many peroxides that are used in a crosslinked polyethylene composition as crosslinking agents are commercially available. Those stable ones are usually selected as crosslinking agents to facilitate storage and mixing. However, to ensure a proper crosslinking retardation safety, a crosslinking agent should be able to form free substances, such as free radicals, rapidly and easily under a crosslinking temperature.

U.S. Pat. No. 3,214,422 discloses some conventional crosslinking agents. The reference document is incorporated herein in entirety for reference.

Examples of crosslinking agents including commercially available products are: 1,1-di(tert-butylperoxy)-3,3,5-trimethyl cyclohexane; 2,7-dimethyl-2,7-di(tert-butylperoxy)octadiyne-3,5; 2,7-dimethyl-2,7-di(peroxyethyl carbonate)octadiyne-3,5; 3,6-dimethyl-3,6-di(peroxyethyl carbonate) octyne-4; 3,6-dimethyl-3,6-di(tert-butylperoxy)octyne-4; 2,5-dimethyl-2,5-di(peroxybenzoate)hexyne-3; 2,5-dimethyl-2,5-di(peroxy n-propyl carbonate) hexyne-3; 2,5-dimethyl-2,5-di(peroxy isobutyl carbonate)-hexyne-3; 2,5-dimethyl-2,5-di(peroxyethyl carbonate)hexyne-3; 2,5-dimethyl-2,5-di(alpha-cumyl peroxy) hexyne-3; 2,5-dimethyl-2,5-di(peroxy betachlorethyl carbonate) hexyne-3; 2,5-dimethyl-2,5-di(tert-butylperoxy)hexyne-3 (DTBH); butyl-4,4-di(tert-butylperoxy)valerate; di(2,4-dichlorobenzoyl) peroxide; di(4-methylbenzoyl) peroxide; di(tert-butylperoxy isopropyl)benzene; dibenzoyl peroxide; dicumyl peroxide (DCP); ditert-butyl peroxide; tert-butylcumyl peroxide: tert-butyl peroxy-3,5,5-trimethylhexanoate; tert-butylperoxy benzoate; and/or tert-butylperoxy2-ethylhexyl carbonate.

However, a universal problem arises when all the above peroxides are employed as crosslinking agents of the polyethylene composition. The range of processing temperatures of the crosslinked polyethylene composition is quite narrow. The composition exhibits initial decomposition in the usually-adopted range of processing temperatures or treatment temperatures (such as 145 to 160° C.). Particularly, in the low-temperature range (<185° C.) of the typical crosslinking temperatures (180 to 220° C.) of the crosslinked polyethylene composition, premature crosslinking would occur in the polyethylene composition, which not only limits the yield of the extruder, injection molding machine or the rotational molding machine, but also exerts adverse influence on the final properties of the formed article.

The present invention reveals a crosslinked polyethylene composition system consisting mainly of a crosslinking agent and an aid, which enables effective inhibition of premature crosslinking (increasing the crosslinking retardation time) of the crosslinked polyethylene composition, which thus raises the safety processing temperature and typical crosslinking temperature of the crosslinked polyethylene composition, shows the relatively fast curing (crosslinking) speed, and effectively increases the final crosslinking degree of the polyethylene composition. The effective chemical component of such crosslinking agents includes an organic peroxide having a half-life period >3 minutes at 190° C. and/or a multi-membered heterocyclic alkane and/or derivatives thereof comprising 3-6 carbon atoms and 3-6 oxygen atoms. Examples of the abovementioned crosslinking agents are 3,6,9-triethyl-3,6,9-trimethyl-1,4,7 triperoxynonane, 3,3,5,7,7-pentamethyl-1,2,4-trioxepane, 3,3,5,7,7-pentamethyl-1,3,5-trioxepane, 2,2,4,6,6-pentamethyl-1,2,4-trioxepane, 2,2,4,6,6-pentamethyl-1,3,5-trioxepane, and/or a mixture thereof or derivatives thereof.

The most frequently used crosslinking promoters include organic substances containing maleimido, (methyl)acrylate group, and/or allyl, and/or polymers containing more than 50% of vinyl, such as 1,2-polybutadiene. Examples of commercially available crosslinking promoters include: cis-1,2-polybutadiene (1,2-BR); diallyl terephthalate (DATP); triallyl isocyanate (DAIC); divinylbenzene (DVB); triallyl cyanurate (TAC); and/or triallyl cyanurate (TAP).

The abovementioned combination of a crosslinking agent and a crosslinking aid can significantly improve the crosslinking efficiency of the crosslinking agent in this invention by inhibiting adverse side reactions, wherein adverse side reactions include premature crosslinking, chain scission and chain disequilibrium.

Generally, a torque value may reflect viscosity of a melt before the crosslinking, and reflect the crosslinking degree of the shaped product after the crosslinking. In this description, "M" represents a torque value tested at the temperature of 220° C.; "$M_{max}$" and "$M_{min}$" represent the maximum and minimum torque values tested at the temperature of 220° C. respectively; $t(M_{max})$ and $t(M_{min})$ represent the time of the maximum and minimum torque values tested at the temperature of 220° C. respectively; gel content is represented by δ torque value, δ(delta) torque value is calculated by "$M_{max}$"–"$M_{min}$"; safety processing window (range) is represented by "crosslinking retardation time": "crosslinking retardation time" is represented by $t(M_{min}+2)$; crosslinking speed is represented by $(0.8M_{max}-1.2M_{min})/(t(0.8M_{max})-t(1.2M_{min}))$, Crosslinking Efficiency Index, i.e. CEI, is the product of the crosslinking retardation time and the crosslinking speed initiated by available oxygen in a unit, measured by $((0.8M_{max}-1.2M_{min})/(t(0.8M_{max})-t(1.2M_{min}))\times t(M_{min}+2)$/mass of available oxygen in the crosslinking system.

EXAMPLES

The present invention will be further described by the following detailed exemplary embodiments, but these examples do not set any limit to the present invention.

In the following examples, unless otherwise specified, weight percent (wt. %) is based on the weight of the polyethylene resin.

Example 1A

The torque rheological property of a composition, which is formed by high-density polyethylene (HDPE) containing a peroxide crosslinking system (PTTP+TAIC), was measured at the temperature of 180° C.

Figure 4:
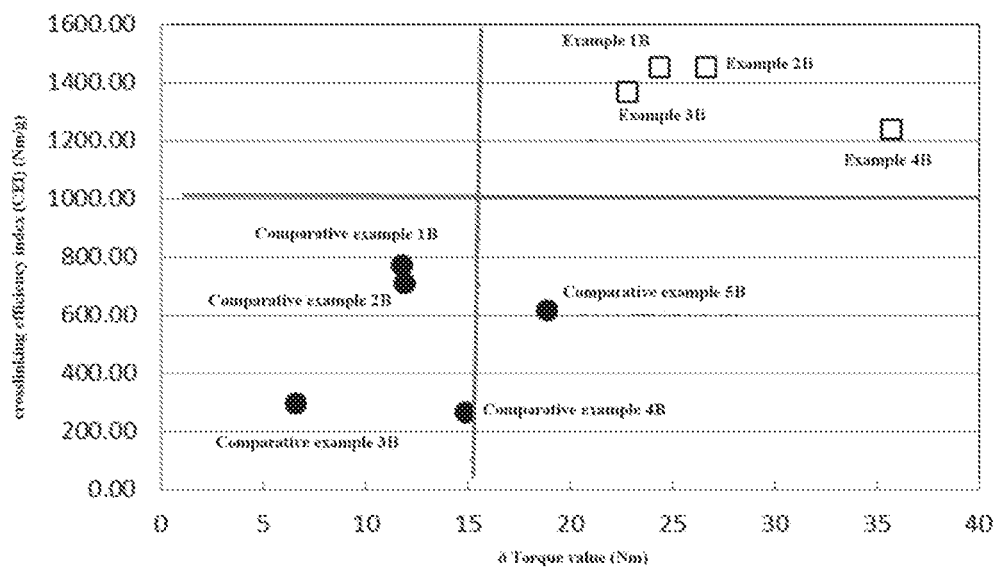
FIG. 4 is a comparison schematic diagram of crosslinking efficiency indexes and δ torque values of various crosslinked polyethylene compositions in Examples 1B-4B and Comparative Examples 1B-5B.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,2,4,6,6-pentamethyl-1,3,5-trioxepane (PTTP), 0.18 g (0.4 wt. %) of crosslinking aid triallyl isocyanate (TAIC), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 180° C. Torque values were measured and recorded in real time during the entire mixing and stirring process, and the results were shown in Table 1 hereinbelow. FIGS. 1 and 4 were drawn according to the test results.

Comparative Example 1A

The torque rheological property of a composition, which is formed by high-density polyethylene (HDPE) containing a peroxide crosslinking system (DTBH), was measured at the temperature of 180° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,5-dimethyl-2,5-di(tert-butylperoxy)hexyne-3 (DTBH), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 180° C. Torque values were measured and recorded in real time during the entire mixing and stirring process, and the results were shown in Table 1 hereinbelow. FIGS. 1 and 4 were drawn according to the test results.

Comparative Example 2A

The torque rheological property of a composition, which is formed by high-density polyethylene (HDPE) containing a peroxide crosslinking system (DCP), was measured at the temperature of 180° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent dicumyl peroxide (DCP), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 180° C. Torque values were measured and recorded in real time during the entire mixing and stirring process, and the results were shown in Table 1 hereinbelow. FIGS. 1 and 4 were drawn according to the test results.

The Table 1 below shows the physical properties of the polyethylene composition and the torque rheological property thereof at the temperature of 180° C.

TABLE 1

| Parameters | Example 1A | Comparative Example 1A | Comparative Example 2A |
|---|---|---|---|
| Crosslinking Agent Type | PTTP + TAIC | DTBH | DCP |
| Crosslinking Agent Amount (wt. %) | 0.6 | 0.6 | 0.6 |
| Half-life Period of the Crosslinking Agent at 190° C. (minute) | 14 | 1 | <1 |
| Melting Point of the Polyethylene Composition (° C.) | 126 | 126 | 126 |
| Safety Processing Temperature of the Polyethylene Composition (° C.) | >180 | 150 | 155 |
| δ Torque Value (Nm) | — | 9.6 | 17.2 |
| Crosslinking Retardation Time (second) | — | 267 | 125 |
| Crosslinking Speed (Nm/s) | — | Relatively Slow | Slow |

In Table 1 hereinabove, PTTP represents 2,2,4,6,6-pentamethyl-1,3,5-trioxepane; DTBH represents 2,5-dimethyl-2,5-di(tert-butylperoxy)hexyne-3; DCP represents dicumyl peroxide.

In Table 1, the half-life period is measured by following the method described in ISO. 6502:1991. The safety processing temperature refers to the temperature at which the polyethylene composition is completely melted but a crosslinking has not yet occurred; said temperature can be the temperature corresponding to the mutation of the torque value of the polyethylene composition that occurs as the temperature rises, which is measured by the HAKKE torque rheometer. The melting point is measured by following the method described in ASTM F 2625-2007.

Figure 2:
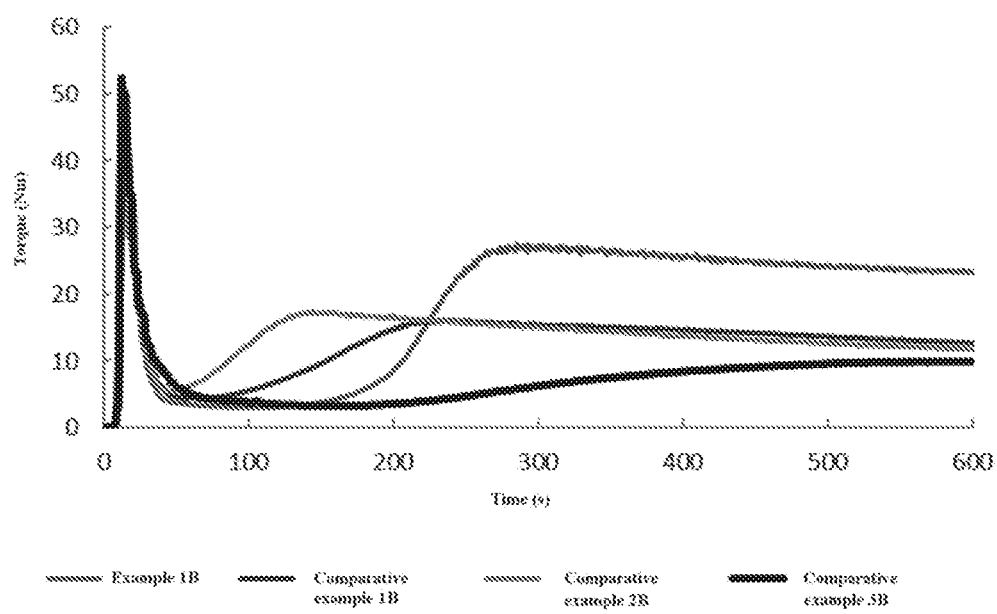
FIG. 2 is a rheogram of the torque values of the various polyethylene compositions in Example 1B. Comparative Example 1B to Comparative Example 3B at the temperature of 220° C.

It could be clearly observed from Table 1 and FIG. 2: no crosslinking is initiated at 180° C. by using the composition in Example 1A of the present invention which is formed by high-density polyethylene (HDPE). On the contrary, a certain degree of crosslinking has already occurred at 180° C. by using the compositions in Comparative Example 1A and Comparative Example 2A which is formed by high-density polyethylene (HDPE). Thus, compared with conventional crosslinking agents, the polyethylene composition of the crosslinking agent system in the present invention has a low viscosity while melting during the rotational molding heating period, and thus is more homogeneous, which not only broadens the processing window (range) of the polyethylene composition, but also effectively prevents premature crosslinking of the polyethylene composition during the rotational molding.

Example 1B

The torque rheological property of a composition, which is formed by high-density polyethylene (HDPE) containing a peroxide crosslinking system (PTTP+TAIC), was measured at the temperature of 220° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,2,4,6,6-pentamethyl-1,3,5-trioxepane (PTTP), 0.18 g (0.4 wt. %) of crosslinking aid triallyl isocyanate (TAIC), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 220° C. Torque values were measured and recorded in real time during the entire mixing and stirring process, and crosslinking efficiency indexes and δ torque values were calculated. The results were shown in Table 2 hereinbelow. FIGS. 2 and 4 were drawn according to the test results.

Comparative Example 1B

The torque rheological property of a composition, which is formed by high-density polyethylene (HDPE) containing a peroxide crosslinking system (DTBH), was measured at the temperature of 220° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,5-dimethyl-2,5-di(tert-butylperoxy)hexyne-3 (DTBH), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 220° C. Torque values were measured and recorded in real time during the entire mixing and stirring process, and crosslinking efficiency indexes and δ torque values were calculated. The results were shown in Table 2 hereinbelow. FIGS. 2 and 4 were drawn according to the test results.

Comparative Example 2B

The torque rheological property of a composition, which is formed by high-density polyethylene (HDPE) containing a peroxide crosslinking system (DCP), was measured at the temperature of 220° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index (I2) of 8 g/10 min (measured by ASTM1238, using a weight of 2.16 Kg at 190° C.), 0.27 g (0.6 wt. %) of peroxide crosslinking agent dicumyl peroxide (DCP), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 220° C. Torque values were measured and recorded in real time during the entire mixing and stirring process, and crosslinking efficiency indexes and δ torque values were calculated. The results were shown in Table 2 hereinbelow. FIGS. 2 and 4 were drawn according to the test results.

Comparative Example 3B

The torque rheological property of a composition, which is formed by high-density polyethylene (HDPE) containing a peroxide crosslinking system (PTTP), was measured at the temperature of 220° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,2,4,6,6-pentamethyl-1,3,5-trioxepane (PTTP), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 220° C. Torque values were measured and recorded in real time during the entire mixing and stirring process, and crosslinking efficiency indexes and δ torque values were calculated. The results were shown in Table 2 hereinbelow. FIGS. 2 and 4 were drawn according to the test results.

The Table 2 below shows the torque rheological properties of the polyethylene composition comprising various peroxide crosslinking agent systems.

TABLE 2

| Parameters | Example 1B | Comparative Example 1B | Comparative Example 2B | Comparative Example 3B |
|---|---|---|---|---|
| Active Oxygen of the Crosslinking Agent System (g) | 0.0235 | 0.0129 | 0.0157 | 0.0235 |
| δ Torque Value (Nm) | 24.4 | 11.8 | 11.9 | 6.6 |
| Crosslinking Retardation Time (second) | 174 | 111 | 70 | 267 |
| Crosslinking Efficiency Index (Nm/g) | 1451 | 774 | 708 | 295 |
| Final Degree of Crosslinking (%) | 85 | 70 | 74 | 64 |

In Table 2 hereinabove. PTTP, DTBH and DCP have the same meanings as those in Table 1. In the present example, the final degree is measured by GBT 18474-2001.

It could be clearly observed from Table 2 and FIG. 2 that, compared with Comparative Example 1 and Comparative Example 2, Example 1 of the present invention has a relatively higher torque value and crosslinking degree, a relatively long crosslinking retardation time and a relatively high crosslinking speed at the temperature of 220° C.; compared with Comparative Example 3, although the crosslinking retardation time of the polyethylene composition of the present invention is slightly shortened at the temperature of 220° C. the torque value, crosslinking degree and crosslinking speed thereof are obviously improved. Thus, Example 1 of the present invention has a relatively high crosslinking efficiency, and provides a technical approach that is simple to operate and can obviously improve the properties of the final articles.

Comparative Example 3A

The torque rheological property of a composition, which is formed by high-density polyethylene (HDPE) containing a peroxide crosslinking system (PTTP), was measured at the temperature of 180° C.

Figure 3:
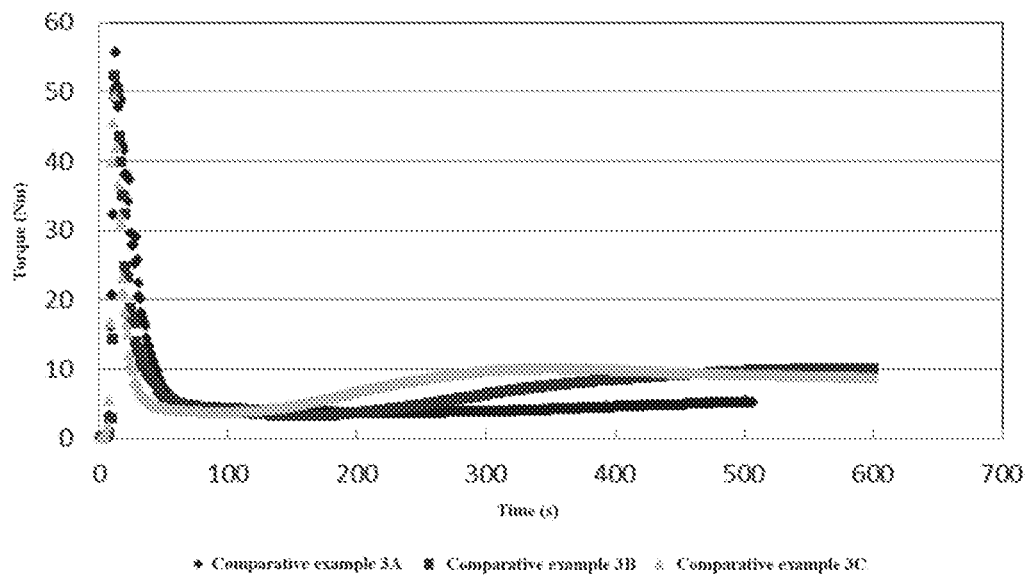
FIG. 3 is a rheogram of the torque values of the various polyethylene compositions in Comparative Examples 3A to 3C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,2,4,6,6-pentamethyl-1,3,5-trioxepane (PTTP), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 180° C. Torque values were measured and recorded in real time during the entire mixing and stirring process, and crosslinking efficiency indexes and δ torque values were calculated. FIGS. 3 and 4 were drawn according to the test results.

Comparative Example 3C

The torque rheological property of a composition, which is formed by high-density polyethylene (HDPE) containing a peroxide crosslinking system (PTTP), was measured at the temperature of 240° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,2,4,6,6-pentamethyl-1,3,5-trioxepane (PTTP), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 240° C. Torque values were measured and recorded in real time during the entire mixing and stirring process. FIGS. 3 and 4 were drawn according to the test results.

It could be observed from FIG. 3 that, by comparing Comparative Examples 3A-3C, the crosslinked polyethylene composition comprising only 2,2,4,6,6-pentamethyl-1,3,5-trioxepane (PTTP) has a relatively low crosslinking speed and a relatively low crosslinking degree at the temperatures of 180° C., 220° C. and 240° C., which can hardly meet the requirement of industrial production.

Comparative Example 4B

The torque rheological property of a composition, which is formed by high-density polyethylene (HDPE) containing a peroxide crosslinking system (PTTP), was measured at the temperature of 220° C.

Except for changing the dosage of the peroxide crosslinking agent 2,2,4,6,6-pentamethyl-1,3,5-trioxepane (PTTP) into 0.45 g (1.0 wt. %), repeat the experimental process of Comparative Example 3B. Torque values were measured and recorded in real time during the entire mixing and stirring process, and crosslinking efficiency indexes and δ torque values were calculated. FIG. 4 was drawn according to the test results.

Comparative Example 5B

The torque rheological property of a composition, which is formed by high-density polyethylene (HDPE) containing a peroxide crosslinking system (DTBH+TAIC), was measured at the temperature of 220° C.

45 g of HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.), 0.27 g (0.6 wt. %) of peroxide crosslinking agent 2,5-dimethyl-2,5-di(tert-butylperoxy)hexyne-3 (DTBH), 0.18 g (0.4 wt. %) of crosslinking aid triallyl isocyanate (TAIC), 0.05 wt. % of antioxidant 1010, 0.05 wt. % of antioxidant 168, 0.03 wt. % of anti-ultraviolet agent UV531 and 0.03 wt. % of anti-ultraviolet agent UV944 were added to a HAKKE torque rheometer. The rotational speed of the formed mixture was set at about 40 (rpm), the mixing temperature was set at 220° C. Torque values were measured and recorded in real time during the entire mixing and stirring process, and crosslinking efficiency indexes and δ torque values were calculated. FIG. 4 was drawn according to the test results.

Example 2B

The torque rheological property of a composition, which is formed by high-density polyethylene (HDPE) containing a peroxide crosslinking system (PTTP+TAIC), was measured at the temperature of 220° C.

Except for changing the dosage of the peroxide crosslinking agent 2,2,4,6,6-pentamethyl-1,3,5-trioxepane (PTTP) into 0.45 g (1.0 wt. %), repeat the experimental process of Example 1B. Torque values were measured and recorded in real time during the entire mixing and stirring process, and crosslinking efficiency indexes and δ torque values were calculated. FIG. 4 was drawn according to the test results.

Example 3B

The torque rheological property of a composition, which is formed by high-melt index and high-density polyethylene (HDPE) containing a peroxide crosslinking system (PTTP+TAIC), was measured at the temperature of 220° C.

Repeat the experimental process of Example 2B except for changing the HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.) into HDPE resin particles (DMDA8920, purchased from Shenhua Baotou Coal Chemical Co., Ltd), with a density of 0.960 g/cm$^3$ (measured by following the method B of ASTM D792) and a melt index ($I_2$) of 22 g/10 min (measured by ASTM1238, using a weight of 2.16 Kg at 190° C.). Torque values were measured and recorded in real time during the entire mixing and stirring process, and crosslinking efficiency indexes and δ torque values were calculated. FIG. 4 was drawn according to the test results.

Example 4B

The torque rheological property of a composition, which is formed by low-melt index and high-density polyethylene (HDPE) containing a peroxide crosslinking system (PTTP+TAIC), was measured at the temperature of 220° C.

Repeat the experimental process of Example 2B except for changing the HDPE resin particles (DGDA8007, purchased from Shenhua Baotou Coal Chemical Co., Ltd), with a density of 0.963 g/cm$^3$ (measured by following the method B of ASTM D792) and a melt index ($I_2$) of 8 g/10 min (measured by ASTM1238, using a weight of 2.16 Kg at 190° C.) into HDPE resin particles (DGDA2480, purchased from Shenhua Baotou Coal Chemical Co., Ltd), with a density of 0.945 g/cm$^3$ (measured by following the method B of ASTM D792) and a melt index (12) of 0.1 g/10 min (measured by ASTM1238, using a weight of 2.16 Kg at 190° C.). Torque values were measured and recorded in real time during the entire mixing and stirring process, and crosslinking efficiency indexes and δ torque values were calculated. FIG. 4 was drawn according to the test results.

FIG. 4 is a comparison schematic diagram of crosslinking efficiency indexes and δ torque values of various crosslinked polyethylene compositions in Examples 1B-4B and Comparative Examples 1B-5B. Results show that the crosslinked polyethylene composition of the present invention has a crosslinking efficiency index of >1000 Nm/g and a δ torque value of >15 Nm at the temperature of 220° C., and, meanwhile, it has a relatively high safety processing temperature and a relatively long crosslinking retardation time. Compared with the crosslinked polyethylene compositions in the comparative examples, it is more suitable for the production of rotational molding articles.

The terms and expression manners in the specification are merely used descriptively but not restrictively, and there is no intention to exclude any equivalents of the represented and described features or constituents thereof when using these terms and modes of expression.

Although several embodiments of the present invention have been represented and described, yet the present invention is not limited to the embodiments as described therein. On the contrary, the person skilled in the art should be aware of any modification and improvement to these embodiments without going against the principle and spirit of the present invention, and the protection scope of the present invention is determined by the attached claims and equivalents thereof.

The invention claimed is:

1. A crosslinked polyethylene composition wherein the composition is prepared by combining: 100 parts by weight of polyethylene, 0.05-5 parts by weight of crosslinking agent, and 0.03-3 parts by weight of crosslinking aid, wherein the polyethylene is a copolymer, homopolymer and/or a mixture thereof; the crosslinking agent is an organic peroxide having a half-life period >3 minutes at 190° C.; the crosslinking aid is diallyl terephthalate (DATP), triallyl isocyanurate (TAIC), a polymer with a vinyl content of higher than 50% selected from the group consisting of 1,2-polybutadiene and cis-1,2-polybutadiene (1,2-BR), an organic substance containing a maleimide or (meth)acrylate group, or combinations thereof; and the crosslinked polyethylene composition has a crosslinking efficiency index of >1000 Nm/g and a 6 torque value of >15 Nm at 220° C. and 40 rpm.

2. The crosslinked polyethylene composition according to claim 1, wherein said crosslinking agent is 3,6,9-triethyl-3,6,9-trimethyl-1,4,7 triperoxynonane, 3,3,5,7,7-pentamethyl-1,2,4-trioxepane, 2,2,4,6,6-pentamethyl-1,3,5-trioxepane, and/or a mixture thereof.

3. The polyethylene composition according to claim 1, wherein the crosslinking aid is cis-1,2-polybutadiene (1,2-BR).

4. The polyethylene composition according to claim 1, wherein the crosslinking aid is triallyl isocyanurate (TAIC).

5. The polyethylene composition according to claim 1, wherein the crosslinking aid is diallyl terephthalate (DATP).

6. The polyethylene composition according to claim 1, wherein the crosslinking degree of the crosslinked polyethylene composition is higher than 55% but lower than 95% after formation.

7. The polyethylene composition according to claim 1, wherein said crosslinked polyethylene composition is rotationally molded to produce articles.

* * * * *